(12) United States Patent
Povitz (10) Patent No.: US 9,925,473 B2
(45) Date of Patent: Mar. 27, 2018

(54) BALLOON HOLDER

(71) Applicant: Cary Povitz, Montréal (CA)

(72) Inventor: Cary Povitz, Montréal (CA)

( * ) Notice: Subject to any disclaimer, the term of this patent is extended or adjusted under 35 U.S.C. 154(b) by 0 days.

(21) Appl. No.: 14/905,953

(22) PCT Filed: Aug. 17, 2015

(86) PCT No.: PCT/CA2015/000467
§ 371 (c)(1),
(2) Date: Jan. 18, 2016

(87) PCT Pub. No.: WO2017/027952
PCT Pub. Date: Feb. 23, 2017

(65) Prior Publication Data
US 2017/0232353 A1   Aug. 17, 2017

(51) Int. Cl.
| | | |
|---|---|---|
| A63H 3/06 | (2006.01) | |
| A63H 27/10 | (2006.01) | |
| F16M 13/02 | (2006.01) | |
| G10K 5/00 | (2006.01) | |
| A63H 5/00 | (2006.01) | |
| F04B 33/00 | (2006.01) | |

(52) U.S. Cl.
CPC ............... *A63H 27/10* (2013.01); *A63H 5/00* (2013.01); *F04B 33/00* (2013.01); *F16M 13/02* (2013.01); *G10K 5/00* (2013.01); *A63H 2027/1041* (2013.01); *A63H 2027/1058* (2013.01)

(58) Field of Classification Search
USPC .................................................. 446/220–226
See application file for complete search history.

(56) References Cited

U.S. PATENT DOCUMENTS

| | | | | |
|---|---|---|---|---|
| 2,792,669 | A * | 5/1957 | Jackson ................. | A63H 27/10 251/353 |
| 2,924,041 | A * | 2/1960 | Jackson et al. ........ | A63H 27/10 251/353 |
| 4,687,458 | A * | 8/1987 | Handa .................... | A63H 27/10 446/220 |

(Continued)

FOREIGN PATENT DOCUMENTS

| | | | | |
|---|---|---|---|---|
| DE | 4313233 A1 * | 10/1994 | ............. | A63H 27/10 |
| EP | 0105179 | 4/1984 | | |

(Continued)

OTHER PUBLICATIONS

ISR and WO PCT/CA2017/050292.

*Primary Examiner* — Nini Legesse
(74) *Attorney, Agent, or Firm* — Gonzalo Lavin (57) ABSTRACT

There is disclosed a balloon holder for holding a balloon having a tail and a tapered self-closing bladder. The balloon holder comprises a main body having a tail locking mechanism, an elongated member protruding from a bottom extremity of the main body, a support element configured to slide over the elongated member and be positioned on the main body, and a position adjustment mechanism for adjusting the position of the support element on the main body. In use, the tail of the balloon is secured to the main body by the tail locking mechanism and the support element is slid over the elongated member and positioned on the main body using the position adjustment mechanism so as to support the balloon in an upright position.

6 Claims, 12 Drawing Sheets

(56) References Cited

U.S. PATENT DOCUMENTS

| | | | |
|---|---|---|---|
| 4,884,987 A | | 12/1989 | Mason |
| 4,909,289 A | * | 3/1990 | Hagan ................ B67D 1/0832 |
| | | | 137/312 |
| 5,509,540 A | | 4/1996 | Pomerantz |
| 5,738,144 A | * | 4/1998 | Rogers ................ A61M 39/26 |
| | | | 137/614.03 |
| 6,439,950 B1 | * | 8/2002 | Goldman ................ A63H 3/06 |
| | | | 446/220 |
| 6,622,759 B2 | * | 9/2003 | Yang ................ A63H 27/10 |
| | | | 141/114 |
| 8,968,047 B1 | * | 3/2015 | Wicken ................ F16M 11/16 |
| | | | 211/13.1 |
| 9,089,784 B2 | | 7/2015 | Nelson et al. |
| 2006/0289707 A1 | * | 12/2006 | Greenwald ............ A63H 27/10 |
| | | | 248/127 |
| 2007/0049158 A1 | * | 3/2007 | Chou ................ A63H 27/10 |
| | | | 446/220 |
| 2009/0275260 A1 | * | 11/2009 | Lockett ................ A63H 27/10 |
| | | | 446/222 |
| 2013/0186516 A1 | * | 7/2013 | Sidwell ................ B65B 1/00 |
| | | | 141/349 |
| 2014/0284436 A1 | | 9/2014 | Erwin |

FOREIGN PATENT DOCUMENTS

| | | | | |
|---|---|---|---|---|
| EP | 0105179 A1 | * | 4/1984 | ............ A63H 27/10 |
| JP | 3153581 U | * | 9/2009 | |
| WO | WO2015195981 | | 12/2015 | |

* cited by examiner

BALLOON HOLDER

TECHNICAL FIELD

The present disclosure relates to a balloon holder. More specifically, the present disclosure relates to a holder for novelty balloons.

BACKGROUND

Novelty balloon are being used for many occasions such as birthdays, get well messages, anniversaries, as well as for promotional purposes and souvenirs. Those balloons are inflated using lighter than air gases, commonly helium, so that they remain in a standing position.

However, the cost of helium can be prohibitive and requires the use of a helium tank.

Accordingly, there is a need for a device that alleviates those disadvantages.

SUMMARY

The present disclosure provides a balloon holder for holding a balloon having a tail and a tapered self-closing bladder, comprising:
a main body having a tail locking mechanism;
an elongated member protruding from a bottom extremity of the main body;
a support element configured to slide over the elongated member and be positioned on the main body; and
a position adjustment mechanism for adjusting the position of the support element on the main body;
wherein in use the tail of the balloon is secured to the main body by the tail locking mechanism and the support element is slid over the elongated member and positioned on the main body using the position adjustment mechanism so as to support the balloon in an upright position.

The present disclosure also provides a balloon holder wherein the tail locking mechanism includes a door pivotally connected to the main body via a hinge and a door securing mechanism, the tail being secured to the main body by pivoting the door over the tail and toward the main body, and the securing of the door to the main body using the door securing mechanism.

The present disclosure further provides a balloon holder wherein the tail locking mechanism includes a snap fastener having a protruding lip on a first pivoting member and a corresponding groove on a second pivoting member, each pivoting members being connected to the main body via hinges, the tail being secured to the main body by pivoting the first and second members toward one another over the tail, the first and second members being locked into place by the interlocking lip and groove.

The present disclosure still further provides a balloon holder as described above, wherein the support element includes a plurality of support members, which may be flexible, configured to be in contact with and support the balloon and wherein the position adjustment mechanism includes cooperating ratchets positioned on the support element and teeth portion positioned of the securing element.

BRIEF DESCRIPTION OF THE FIGURES

Embodiments of the disclosure will be described by way of examples only with reference to the accompanying drawing, in which.

Similar references used in different Figures denote similar components.

DETAILED DESCRIPTION

Generally stated, the non-limitative illustrative embodiments of the present disclosure provide a balloon holder. More specifically, the present disclosure relates to a holder for keeping novelty balloons upright without requiring a lighter than air gas such as helium. The balloon used in the balloon holder uses air, which is free and is an environmentally friendly alternative to helium (an expensive and non-renewable resource), and an especially designed securing and support structures. The balloon holder also provides for reusability of the balloon, allowing it be deflated for easy storage and future use.

Figure 1:
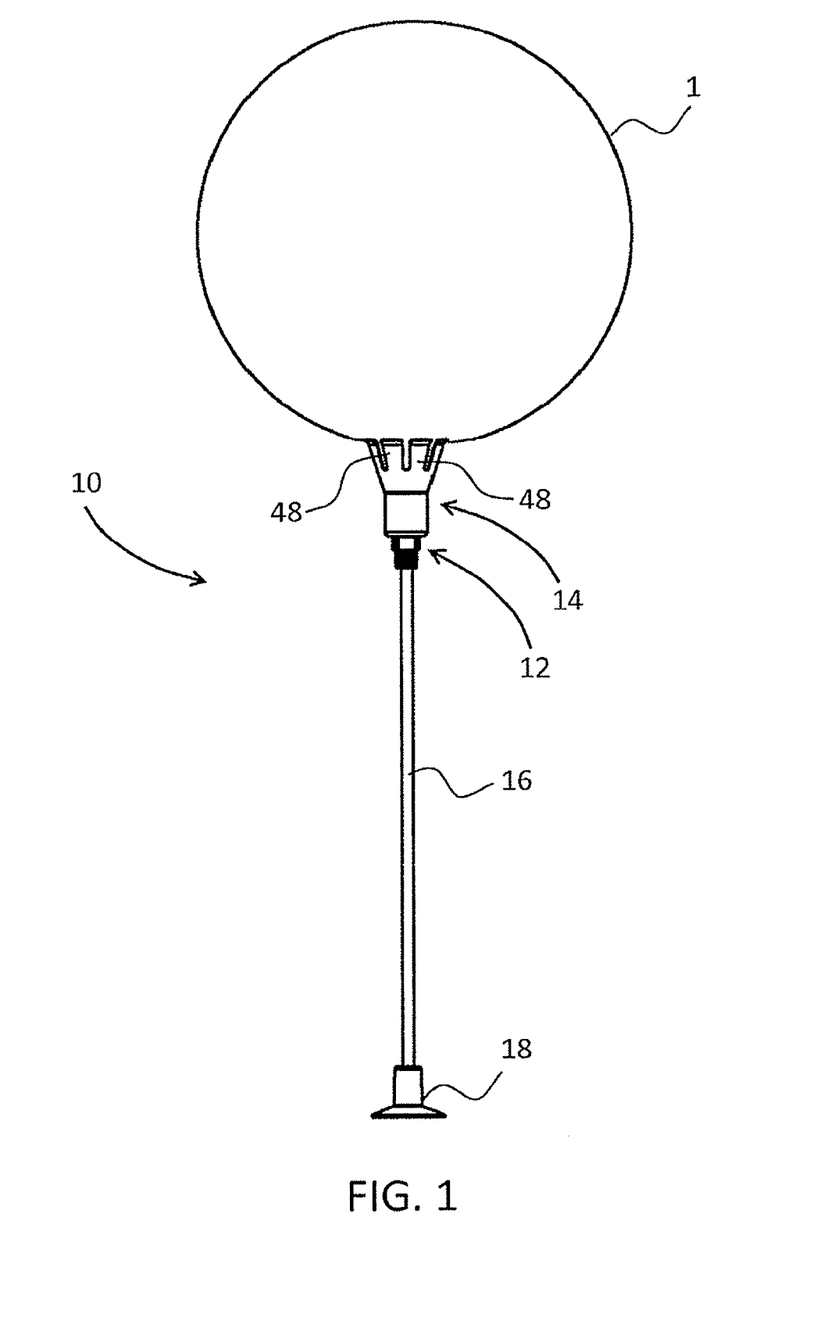
FIG. 1 is a front elevation view of a balloon holder in accordance with a first illustrative embodiment of the present disclosure.

Referring to FIG. 1, the balloon holder 10, in accordance with a first illustrative embodiment of the present disclosure, generally consists of a balloon securing element 12, having a balloon support element 14 slidingly engaged thereon, an elongated wand 16 and, optionally, a base 18, provided with a suction cup, configured to engage and hold upright the elongated wand 16 so as to secure the balloon holder 10 to a flat surface. The purpose of the securing element 12 is to secure the balloon 1 to the balloon holder 10 while the support element 14 maintains the balloon 1 in an upright position without requiring a lighter than air gas, for example helium, while giving the impression that the balloon 1 is floating. The various components of the balloon holder 10 may be made, for example, of polypropylene, plastic or other such light polymeric material.

Figure 2:
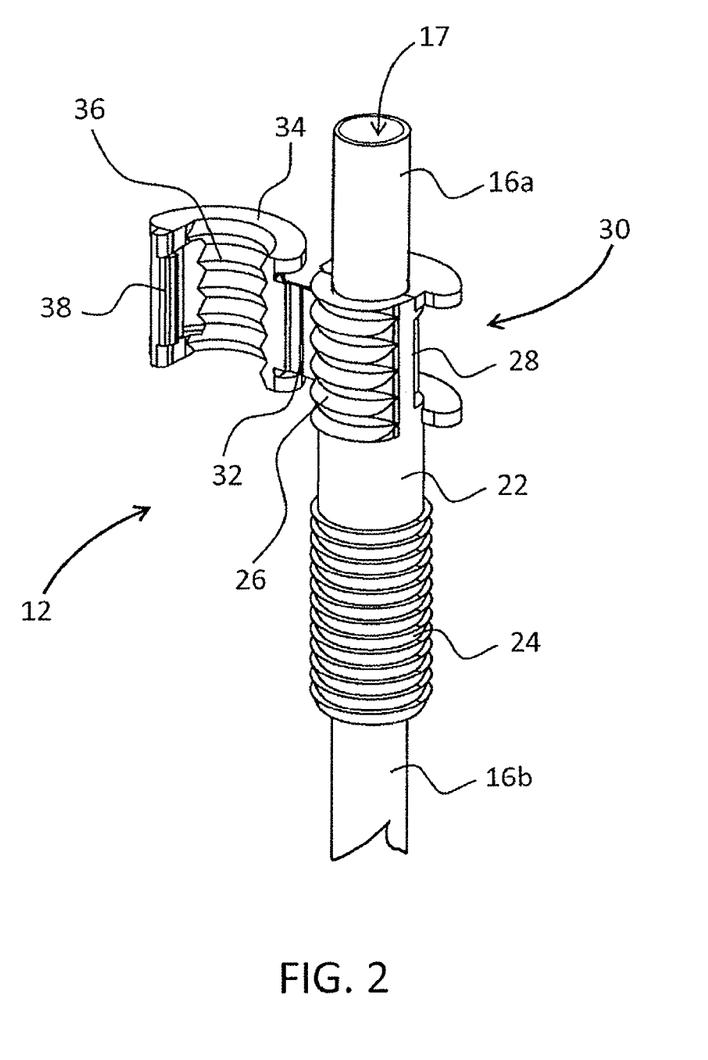
FIG. 2 is an elevated perspective view of the balloon securing element in accordance with the first illustrative embodiment of the present disclosure.

Referring to FIG. 2, the balloon securing element 12 is positioned on the wand 16 such that a first portion 16a of the wand 16 protrudes from a top extremity and a second portion 16b of the wand 16 protrudes from a bottom extremity of the securing element 12. In the first illustrative embodiment of the balloon holder 10, the securing element 12 and the wand 16 are separate elements and are assembled by sliding the wand 16 into a corresponding hole going from a bottom to a top portion of the securing element 12 and secured in this position using any combination of frictional fits adhesives or mechanical assembly means such as a staple. In an alternative embodiment, the wand 16 and the securing element 12 are integral, for example being molded as a single element. In a further illustrative embodiment, the first portion 16*a* and the wand 16 are integral, while the second portion 16*b* and the securing element 12 are assembled by sliding the wand 16 into a corresponding hole going in a bottom portion of the securing element 12 and secured in this position using an adhesive.

The securing element 12 includes a main body 22 having a teethed portion 24 and a tail locking mechanism 30. The locking mechanism 30 is composed of a door 34, having a concave gripping surface 36 and fastener lip 38, connected to the main body 22 through hinge 32, and a corresponding convex gripping surface 26 and fastener groove 28 on the main body 22.

Figure 3:
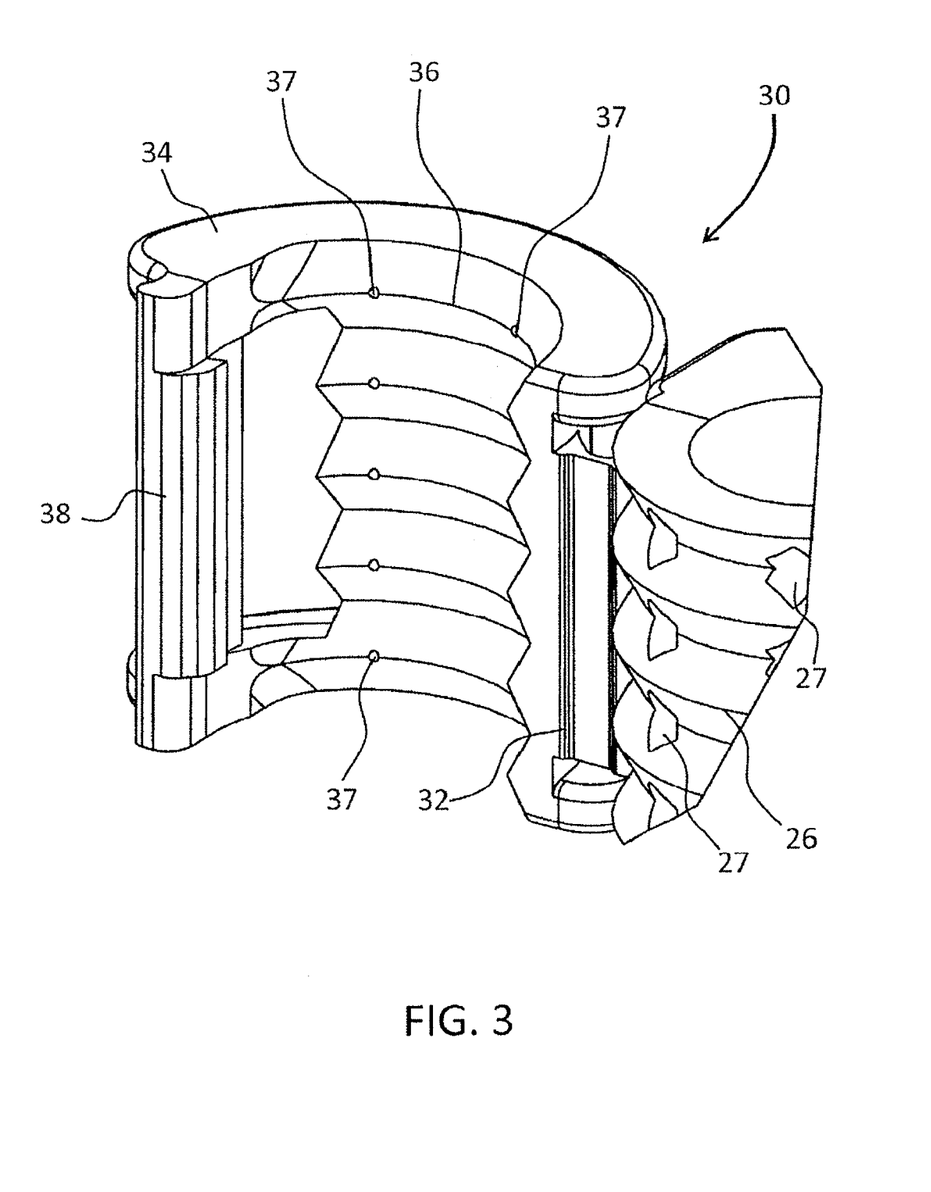
FIG. 3 is a close-up perspective view of the locking mechanism in accordance with an alternative embodiment of the present disclosure.

In an alternative embodiment, shown in FIG. 3, the concave gripping surface 36 may be provided with a plurality of protrusions 37 and the convex gripping surface 26 with a corresponding plurality of cavities 27, which provide, when engaged, additional grip and resistance to upward pulling forces on the tail 4 of the balloon 1. The protrusions 37 may be, for example, conical and the cavities 27 configured so that when the tail 4 is locked into position between the concave 36 and the convex 26 gripping surfaces, its material fills the void in between each protrusion 37 and its corresponding cavity 27.

Figure 4:
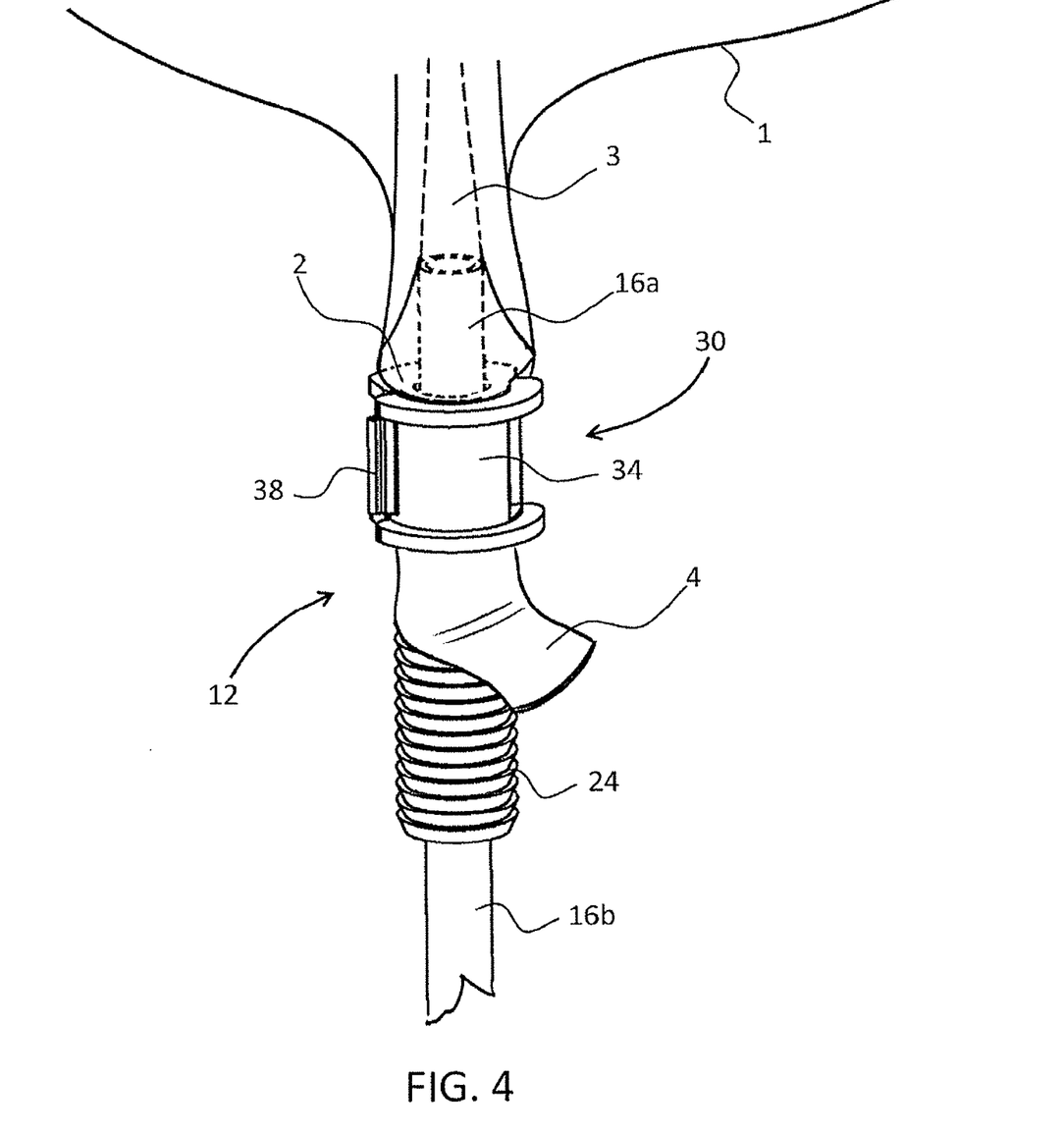
FIG. 4 is an elevated perspective view of the balloon securing element to which is secured a balloon.
Figure 5:
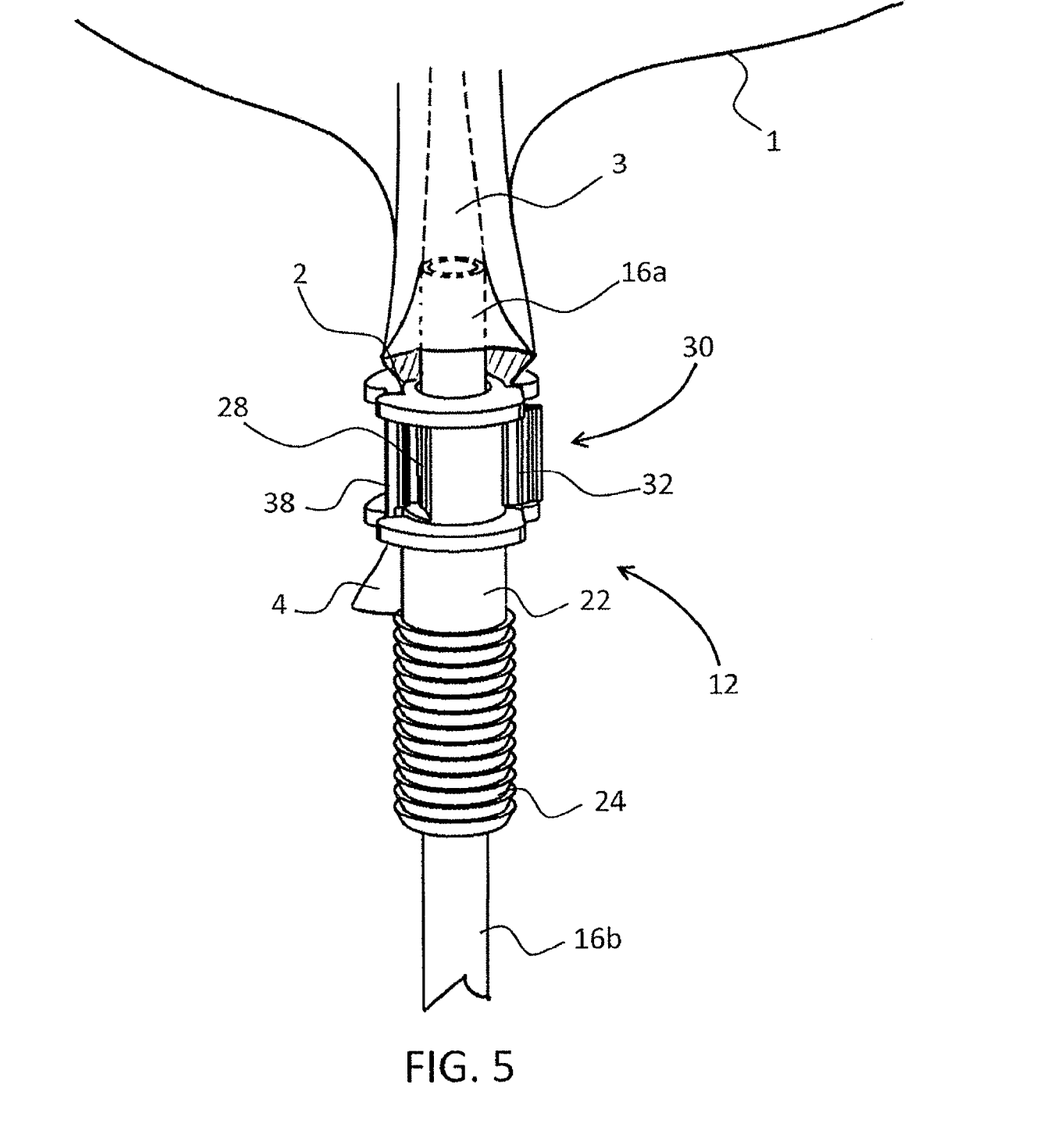
FIG. 5 is the elevated perspective view of the balloon securing element of FIG. 4 axially rotated by 180°.
Figure 6:
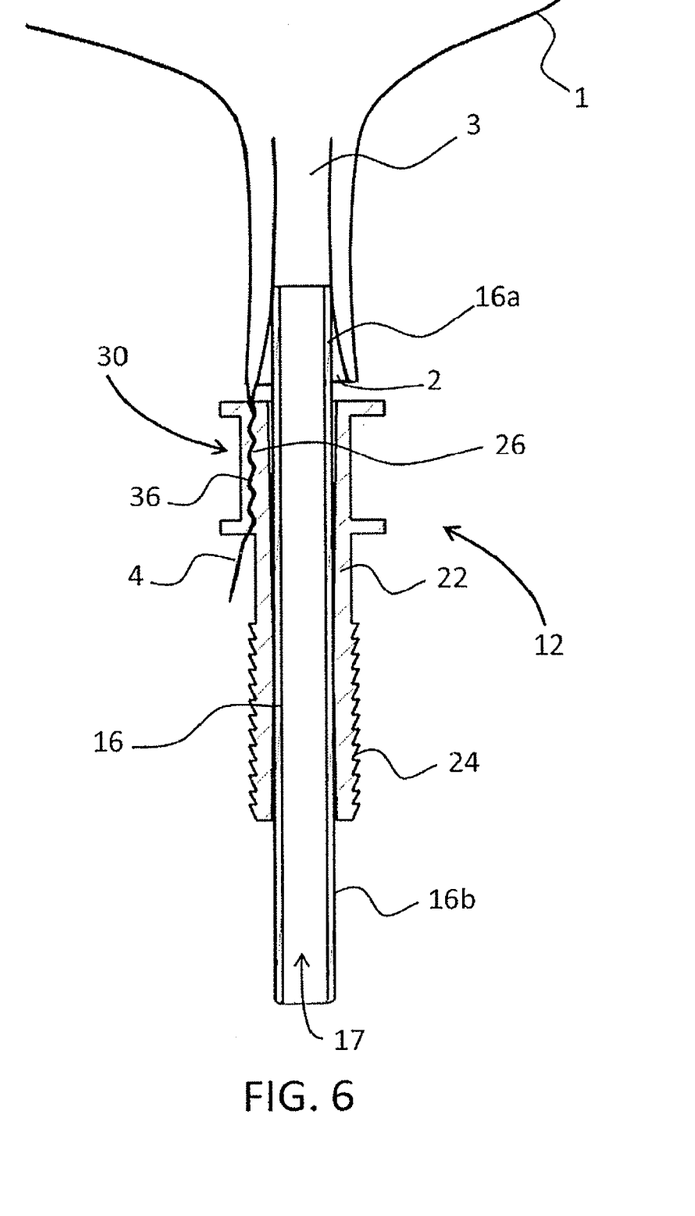
FIG. 6 is a cross-sectional elevated view of the balloon securing element of FIG. 2 to which is secured a balloon.

Referring now to FIGS. 4 to 6, when in use the opening 2 of the balloon 1 is positioned over the first portion 16*a* of the wand 16 such is abuts the tapered self-closing bladder 3 of the balloon 1 and the tail 4 of the balloon 1 is positioned over the convex gripping surface 26 of the main body 22 of the securing element 12. The door 34 is then pivoted towards the main body 22 of the securing element 12, thus gripping the tail 4 between gripping surfaces 36 and 26, and the door 34 secured to the main body 22 by engaging the fastener lip 38 into the fastener groove 28. It is to be understood that in an alternative embodiment the door 34 may be secured using another door securing mechanism. With specific reference to FIG. 6, the wand 16 is advantageously provided with a hollow core 17 along its full length so as to allow the inflating of the balloon 1. The balloon 1 can be inflated prior to its securing to the securing element 12 or may be inflated by pumping air through the hollow core 17 of the wand 16. The hollow core 17 also allows for the insertion into the wand 16 of a tube (not shown) of a diameter smaller than the tapered self-closing bladder 3 of the balloon 1 so that the tube may be inserted through the tapered self-closing bladder 3 and into the balloon 1 in order to deflate it.

Figure 7:
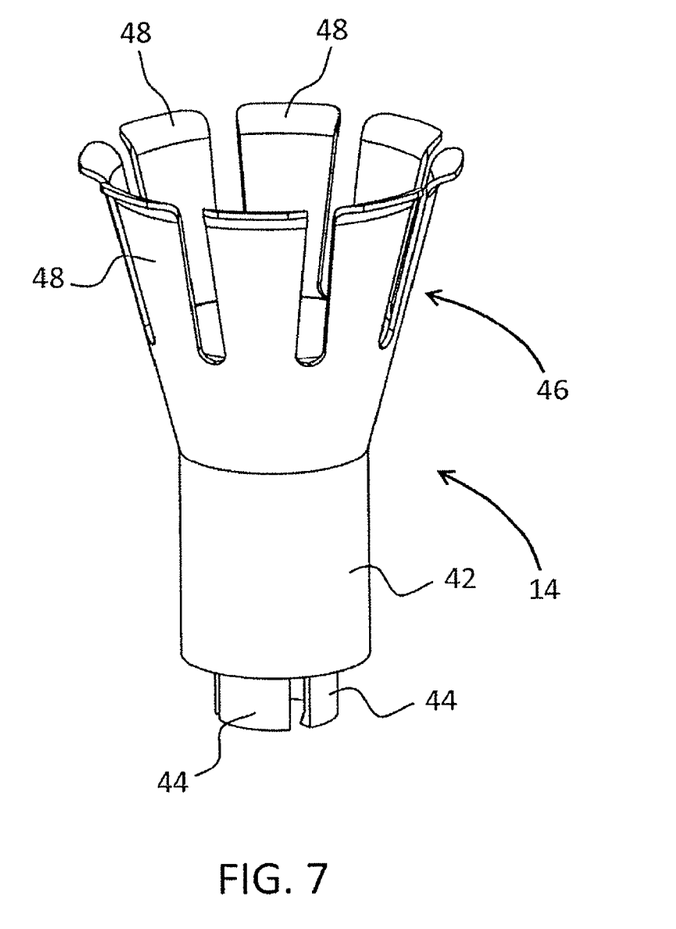
FIG. 7 is an elevated perspective view of the balloon support element.

Referring to FIG. 7, the support element 14 includes a main body 42 having a plurality of ratchets 44 at one end and a basket 46 at an opposed end, the basket 46 having a plurality of support members 48 figured to be in contact with and support the balloon 1. The support members 48 may be flexible so as to accommodate various sizes and shapes of balloons 1 as well as to provide greater mobility for the balloon 1 while still holding if firmly. Although the basket 46 is shown as being circular, it is to be understood that its shape may vary in order to accommodate various shapes of balloons 1, for example in an alternative embodiment the basket 46 may be oval in shape.

Figure 8:
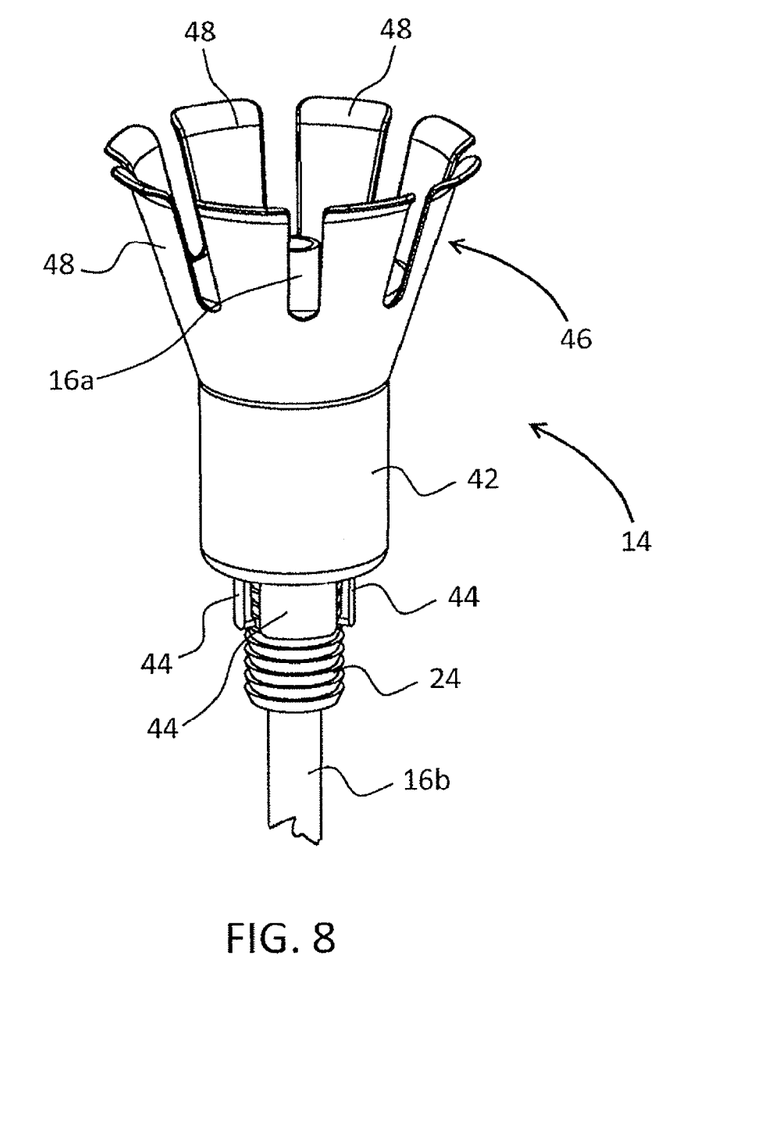
FIG. 8 is an elevated perspective view of the balloon support element positioned on the balloon holder securing element.

Referring to FIG. 8, once the balloon 1 is secured to the securing element 12, the support element 14 is slid over the wand 16 until it slides over the securing element 12 and its ratchets 44 engage the teethed portion 24 of the securing element 12. The position of the support element 14 unto the securing element 12 can be adjusted by the positioning of the ratchets 44 with regard to the teethed portion 24 to accommodate various configurations of balloons 1. It is to be understood that in alternative embodiment the positioning of the support element 14 unto the securing element 12 may be performed using another adjustment mechanism.

Figure 9:
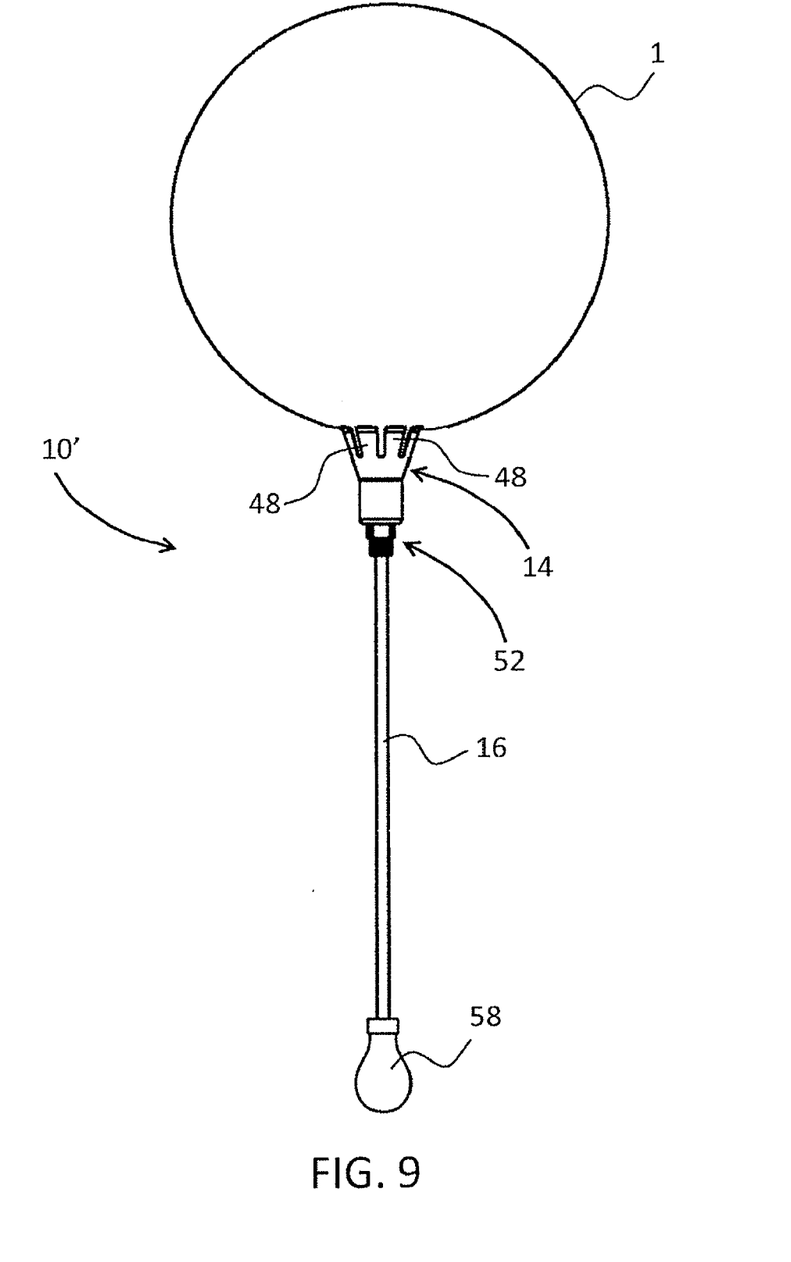
FIG. 9 is a front elevation view of a balloon holder in accordance with a second illustrative embodiment of the present disclosure.

Referring now to FIG. 9, there is shown a balloon holder 10' in accordance with a second illustrative embodiment of the present disclosure, generally consisting of a balloon securing element 52, having the balloon support element 14 slidingly engaged thereon, the elongated wand 16 and an air displacement mechanism 58, which in the second illustrative embodiment is in the form of a compressible bulb. It is to be understood that in an alternative embodiment the compressible bulb may be replaced by another type of air displacement mechanism, such as a pump, as known by a person skilled in the art.

Figure 10:
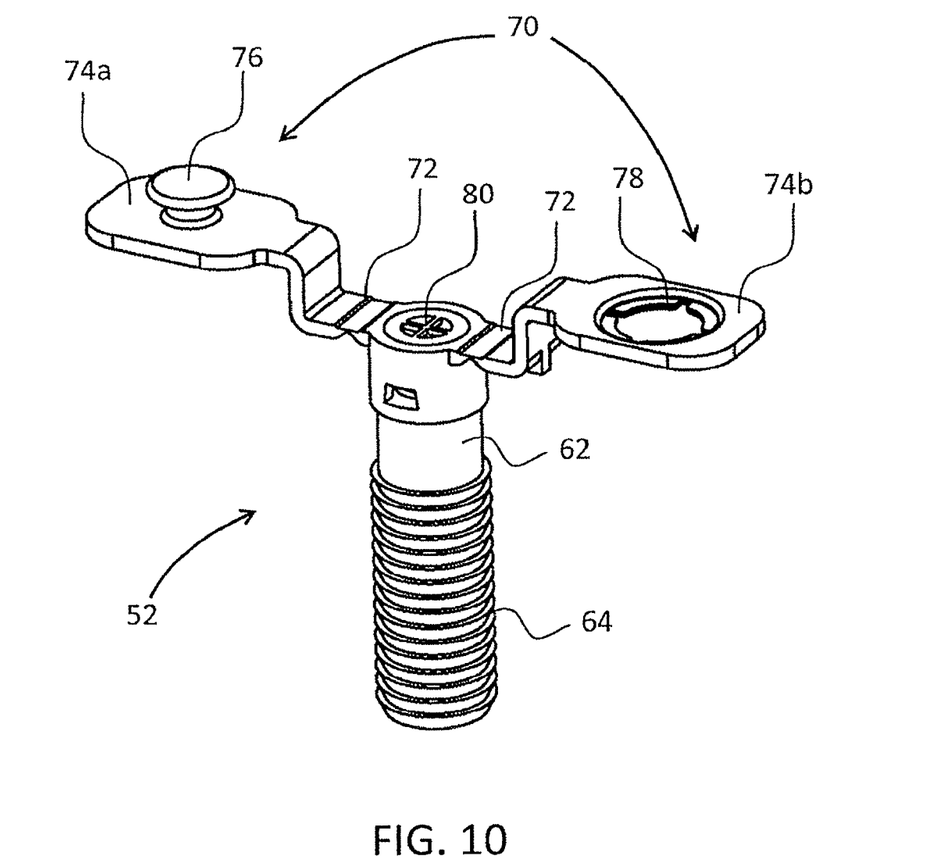
FIG. 10 is an elevated perspective view of the balloon securing element in accordance with the second illustrative embodiment of the present disclosure.

Referring to FIG. 10, the balloon securing element 52 includes a main body 62 having a teethed portion 64 and a locking mechanism 70. The locking mechanism 70 is composed of a snap fastener having a protruding lip 76 on a first pivoting member 74*a* and a corresponding groove 78 on a second pivoting member 74*b*, each pivoting members 74*a*, 74*b* being connected to the main body 62 via hinges 72, and a whistle 80 or other air displacement activated sound producing element.

Figure 11:
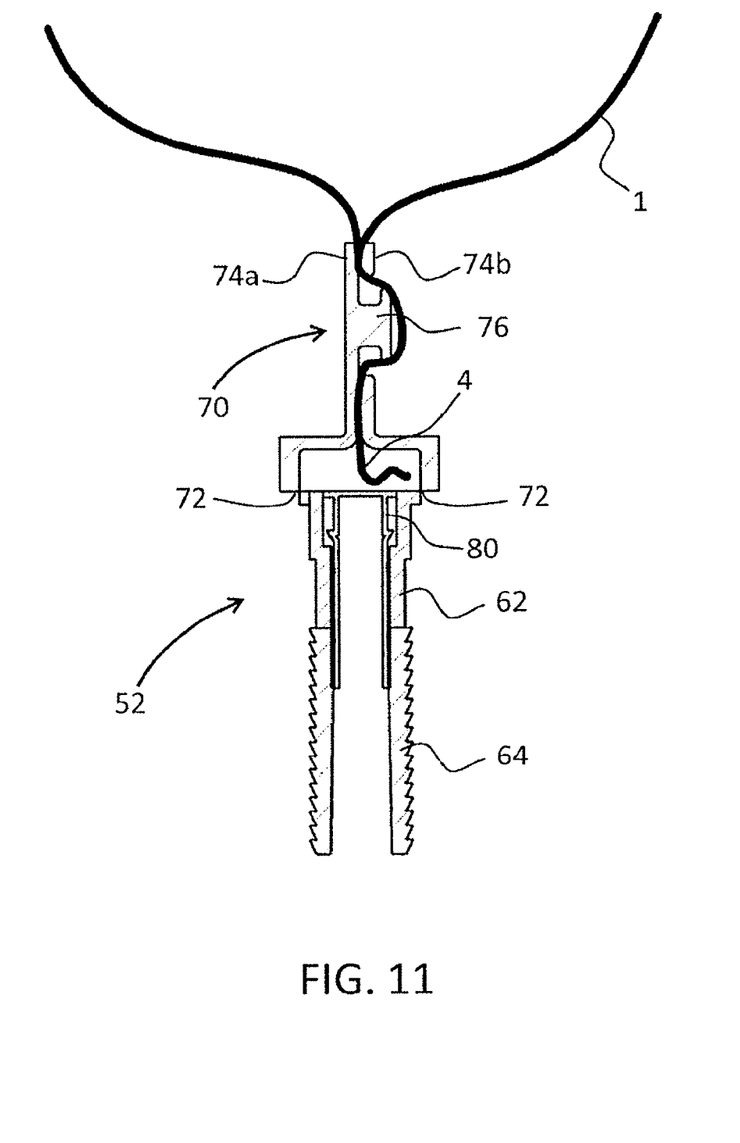
FIG. 11 is a cross-sectional elevated view of the balloon securing element of FIG. 10 to which is secured a balloon.

Referring now to FIG. 11, when in use, tail 4 of the balloon 1 is positioned between the first and second pivoting members 74*a*, 74*b* of the locking mechanism 70, which are then pivoted toward one another such that the tail 4 gets gripped and locked into place by the interlocking lip 76 and groove 78.

Figure 12:
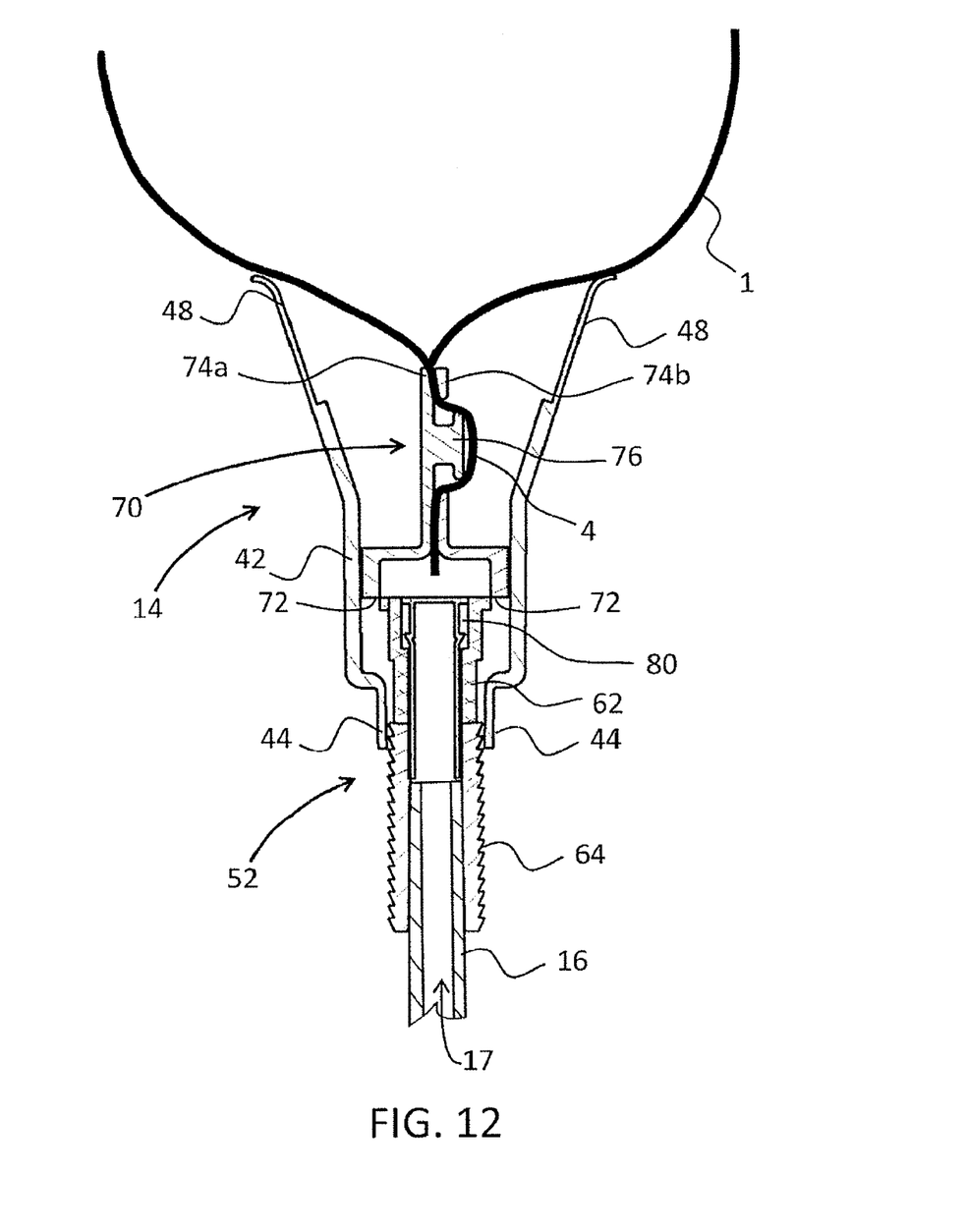
FIG. 12 is a cross-sectional elevated view of the balloon support element positioned on the balloon holder element of FIG. 11.

Referring to FIG. 12, the balloon securing element 52 is positioned on the wand 16, the wand 16 being inserted into an opening at a bottom extremity of the securing element 12 and secured in this position using an adhesive. In an alternative embodiment, the wand 16 and the securing element 52 are integral, for example being molded as a single element. The whistle 80 is inserted into an opening at a top extremity of the securing element 52 or, in an alternative embodiment, is integral with the securing element 52, for example being extruded as a single element.

Once the balloon 1 is secured to the securing element 52, the support element 14 is slid over the wand 16 until it slides over the securing element 52 and its ratchets 44 engage the teethed portion 64 of the securing element 52. The position of the support element 14 unto the securing element 52 can be adjusted by the positioning of the ratchets 44 with regard to the teethed portion 64 to accommodate various configurations of balloons 1. It is to be understood that in alternative embodiment the positioning of the support element 14 unto the securing element 52 may be performed using another adjustment mechanism.

Referring back to both to FIGS. 9 and 12, in use, the air displacement mechanism 58 is activated, for example by repeatedly pressing the air displacement mechanism 58, which in the second illustrative embodiment is in the form of a compressible bulb, resulting in air being pushed up the hollow core 17 of the wand 16 up into the whistle 80, thus activating it and producing sound.

Although the present disclosure has been described with a certain degree of particularity and by way of illustrative embodiments and examples thereof, it is to be understood that the present disclosure is not limited to the features of the embodiments described and illustrated herein, but includes all variations and modifications within the scope and spirit of the disclosure as hereinafter claimed.

The invention claimed is:

1. A balloon holder for holding a balloon having a tail and a tapered self-closing bladder, comprising:
   a main body having a tail locking mechanism;
   a hollow elongated member protruding from a bottom extremity of the main body;
   a support element configured to slide over the elongated member and be positioned on the main body; and
   a position adjustment mechanism for adjusting the position of h support element on the main body;
   wherein in use the tail of the balloon is secured to the main body by the tail locking mechanism and the support element is slid over the elongated member and positioned on the main body using the position adjustment mechanism so as to support the balloon in an upright position; and
   wherein the tail locking mechanism includes a snap fastener having a protruding lip on a first pivoting member and a corresponding groove on a second pivoting member, each pivoting member being connected to the main body via hinges, the tail being secured to the main body by vertically pivoting the first and second members toward one another over the tall, the first and second members being locked into place by the interlocking lip and groove, the tail collapsing on a longitudinal axis.

2. The balloon holder of claim 1, further comprising an air displacement activated sound producing element positioned into a top extremity of the main body.

3. The balloon holder of claim 2, wherein the air displacement activated sound producing element and the main body are integral.

4. The balloon holder of claim 2, wherein the air displacement activated sound producing element is a whistle.

5. The balloon holder of claim 1, further comprising an air displacement mechanism operatively connected to an end of the elongated member opposite the main body.

6. The balloon holder of claim 5, wherein the air displacement mechanism is selected from a group consisting of a compressible bulb and a pump.

* * * * *